United States Patent [19]
Lacy

[11] 3,724,929
[45] Apr. 3, 1973

[54] AIR-FREE LIQUID VARIABLE LIGHT FILTER SYSTEM

[75] Inventor: Mount L. Lacy, Jacksonville, Fla.

[73] Assignee: Mount Lacey Enterprises, Inc., Salt Lake City, Utah

[22] Filed: Jan. 12, 1971

[21] Appl. No.: 105,985

Related U.S. Application Data

[63] Continuation of Ser. No. 628,984, April 6, 1967, abandoned.

[52] U.S. Cl..................................350/312, 137/563
[51] Int. Cl..............................................G02b 5/24
[58] Field of Search............350/312, 314, 276, 267; 303/104; 137/558, 563, 583

[56] References Cited

UNITED STATES PATENTS

| 786,613 | 4/1905 | Villani | 350/312 |
|---|---|---|---|
| 2,439,553 | 4/1948 | Winn | 350/312 X |
| 2,489,751 | 11/1949 | Candler | 350/312 X |
| 2,596,566 | 5/1952 | Lacy et al. | 350/312 |
| 2,783,682 | 3/1957 | Swenson | 350/312 X |
| 3,016,801 | 1/1962 | Michel | 350/312 |
| 3,368,862 | 2/1968 | Dean | 350/312 |

*Primary Examiner*—David Schonberg
*Assistant Examiner*—Ronald J. Stern
*Attorney*—Stevens, Davis, Miller & Mosher

[57] ABSTRACT

A hermetically sealed, air-free system for screening and filtering electromagnetic ray energy from the sun, having a means within the system for changing from one degree of screening and filtering to another by the use of two or more immiscible liquids in a light transmission cavity, said liquids having different specific gravities so as to maintain separate liquid bodies while stationary within the system and while being changed.

23 Claims, 9 Drawing Figures

PATENTED APR 3 1973 3,724,929

INVENTOR
MOUNT L. LACY

BY
Stevens, Davis, Miller & Mosher
ATTORNEYS

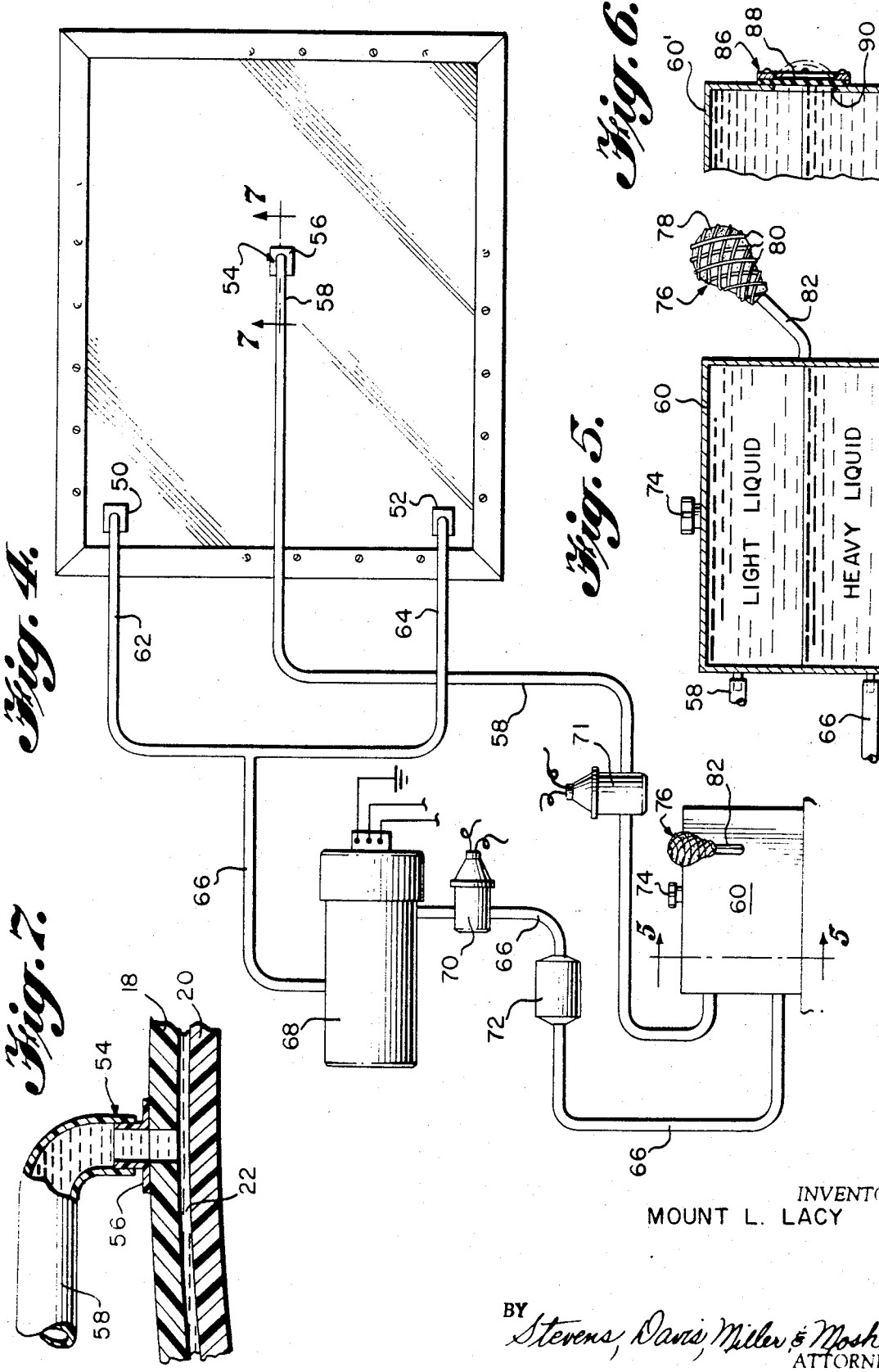

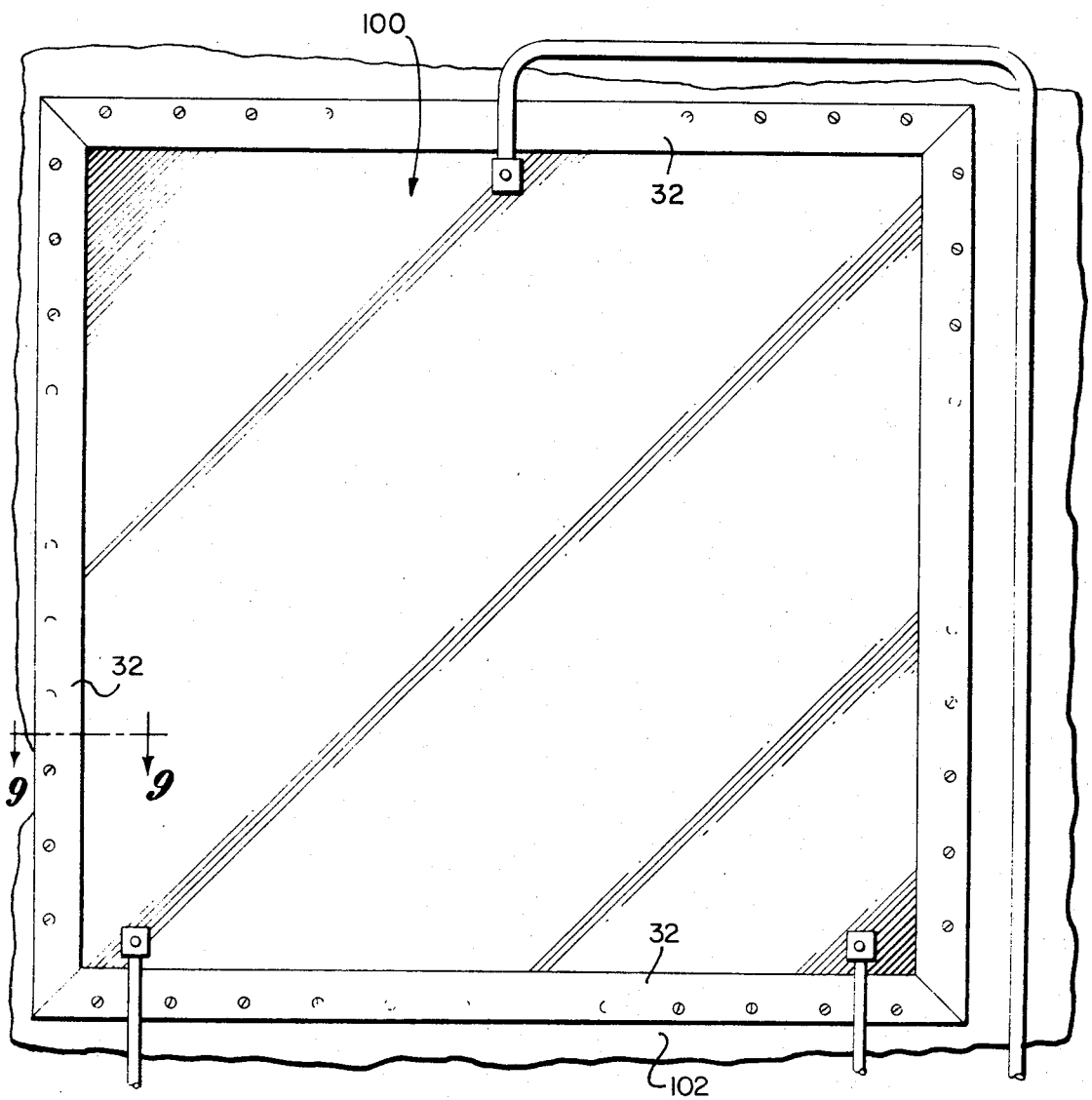
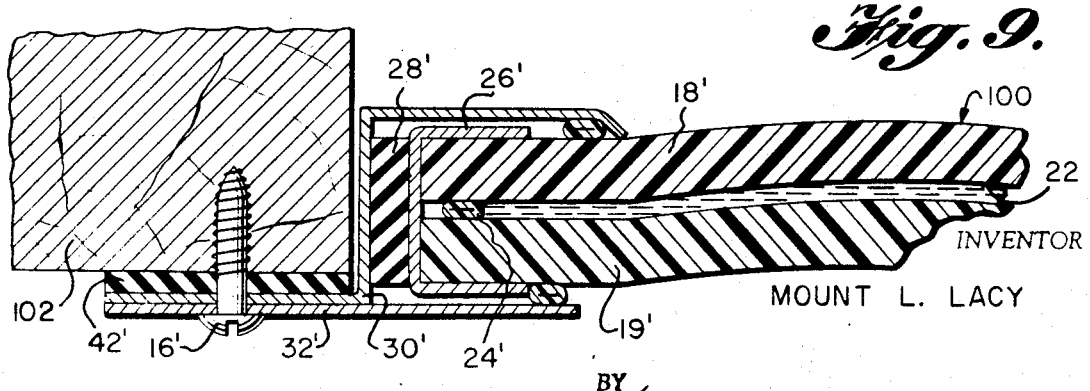

AIR-FREE LIQUID VARIABLE LIGHT FILTER SYSTEM

This is a continuation application of application Ser. No. 628,984 filed Apr. 6, 1967, now abandoned.

This invention relates to a device that will screen and filter rays from the sun and that can change from one degree of screening and filtering to another to effect controlled transmission of solar radiation.

Many attempts have been made to provide windows, roofs, and skylights with devices having means between sheets or plates of transparent material that would remove harmful or undesirable electromagnetic radiation from the sun, such as infrared rays, and the like. These devices employ a cavity or a series of cavities defined by spaced transparent plates and contain within the cavity liquid capable of screening or filtering the undesirable or unwanted radiation from the sun passing through the liquid in the cavity. One of the principal difficulties in using such devices is the requirement for changing from one liquid to another in order to change the type of filtering of the sun's rays to make such a system practical. Heretofore, the systems have not been air-free and thus the problem of air bubbles occurred bringing about interphase mixing of the liquids. To eliminate the interphase problems between liquids, some prior art systems utilized double cavity arrangements having a different liquid in each cavity. This type of system is bulky and expensive to build, operate, and maintain.

This invention presents a device that overcomes the difficulties of the prior art devices and contemplates an hermetically sealed, substantially air-free screening and filtering system for radiation from the sun by providing two equally spaced sheets or plates of transparent material with a gasket between them positioned around their outer edge so as to form a thin, elongated cavity therebetween. Suitable entry and exit connections are provided at the top and bottom of the cavity to allow for flow of liquids contained in the cavity through the openings to and from a reservoir tank connected to said openings. When the system contains two immiscible liquids, one heavier than the other, one liquid flows from the reservoir through one opening into the cavity while the other liquid flows from the cavity through the other opening to a reservoir tank. Since each of the immiscible liquids has a different specific gravity, one will gravitationally position itself below the other and present a clearly delineated interphase between the liquids. Each liquid will have different capabilities for screening or filtering the rays so that, depending on which liquid is in the cavity, there may be no filtering when a light liquid is used, or there may be varying degrees or different types of filtering accomplished when a heavy liquid is used.

The system of this invention is hermetically sealed by having a bleeder valve arrangement so that air can be excluded from the system to reduce to a minimum the formation of air bubbles within the system when the liquids are being interchanged to effect different types of screening and filtering. When the heavy liquid is in the cavity, the lighter liquid is mainly in the reservoir. To change from the heavy liquid to the lighter one, a pumping means conveys the heavy liquid from the cavity through an opening or openings in the bottom of the cavity into the reservoir tank which forces the lighter liquid through the opening or openings in the top of the cavity, thus maintaining a closed, air-free system with an interphase movement in both the cavity and the reservoir tank as the change of heavy liquid for a light one is made.

Advantageously, the screening and filtering system of this invention may be arranged so that the reservoir tank has an expansion means in it to accommodate for expansion and contraction of the liquids due to heating of the liquid or changes in cavity size due to heat or wind pressure. such an expansion means allows for the maintenance of an air-free liquid system which can operate without the introduction of air bubbles that would make the system both unattractive and inefficient.

Advantageously, the elongated, relatively thin cavity of this invention may be somewhat curved or convex in form by using two mating, equally spaced, convex or curved transparent plates with a gasket around their edge to maintain them at an equal distance from each other, and thus form a rigid structural member that is capable of providing a relatively large transparent area, such as for windows, domes, and the like. The curved arrangement of the transparent sheets provides for strength of the cavity unit and maintains the space between the sheets constant over a large service area, such as is required when this system is used to screen and filter unwanted radiation from car tops, airplane canopies, windows, large dome arrangements, and the like. It has been found in the case of windows that, by being made convex, they will withstand windage to 1,000 m.p.h., which is a safety factor of 600 percent. Also, the space between the transparent sheets may be from about one-sixteenth inch to about three-sixteenths inch depending on the type of liquids to be used, their viscosity, and the thickness of screening and filtering liquid for the type of filtering to be done.

Advantageously, the system of this invention may employ three or more immiscible liquids, each heavier than the other, so that a multiple of screening and filtering effects can be had. For example, one liquid can be provided for normal light transmission through the device, another liquid can be used for removing infrared rays, and still another may admit the infrared while blocking some of the rays in the visible range, and so forth. Such a system can provide for screening out visible rays while admitting solar heat radiation to supplement heating systems in the winter, or can screen out the infrared rays to assist cooling systems in the summer. Thus it can be seen that the device of this invention can provide a variety of screening and filtering effects in a unitary, uncomplicated system that requires only the flip of a switch to change the screening and filtering capacity of the cavity in the device.

It has been found that the liquids employed in this invention must be immiscible to each other and have good surface wetting properties for glass, Lucite, or other types of transparent material. The liquids also must have good cleaning action that leaves no residue and should have substantially the same viscosity. If infrared rays are to be screened out, glycol (antifreeze) may be used for the heavy liquid, and when light is to be admitted substantially unfiltered, white mineral oils (light oil) may be used. Exemplary of these light oils are the Penn-Drake white mineral oils known as "Drakeol 6." Their "Drakeol 7" and "9" and "Clearteck," "Liteteck," and "Peneteck" also may be used. These PennDrake oils are produced by the Pennsylvania Refining Company and the properties of the oils are disclosed in their bulletin entitled "Product Specifications Penn-Drake White Mineral Oils." It will be appreciated that the heavy liquid may contain various colors in solution or a true suspension capable of filtering different types of solar radiation, and that density of the color in the liquid may be such as to effect the required degree of filtering in relation to the cavity.

The screening and filtering system of this invention may be used in windows, automobile tops, airplane canopies, space helmets, eyeglasses, windshields, partitions, roof tops, homes, astrodomes, signs, and the like. It has been estimated that when used as windows in commercial buildings, a 25 percent saving on heating can be achieved and a 50 percent saving in air conditioning installation and operating cost. The windows of this invention also eliminate the need for awnings, venetian blinds, sun drapes, sun screens, and the like.

These and other objects of my invention will become apparent from the description of the following embodiments and the drawings thereof in which:

FIG. 4 is the schematic arrangement of the device illustrated in FIG. 1, showing a reservoir tank for holding two immiscible liquids and a pump for conveying the liquids between the reservoir and the cavity;

FIG. 5 is a cross-sectional view taken on line 5—5 of FIG. 4 showing two immiscible liquids in the reservoir and a liquid expansion ball means operatively connected to it;

FIG. 6 is a fragmentary view of a portion of the reservoir as shown in FIG. 5 with a diaphragm type liquid expansion means operatively connected to it;

FIG. 7 is a fragmentary view, partly in cross-section, taken on a line 7—7 of FIG. 4 showing a typical inlet-outlet connection to the cavity between plates for the entrance and egress of liquid during the changing of liquids;

FIG. 8 is a view in elevation of a window employing the system of this invention; and FIG. 9 is a cross-sectional view taken on a line 9—9 of FIG. 8 showing the device connected to a window joist.

Figure 1:
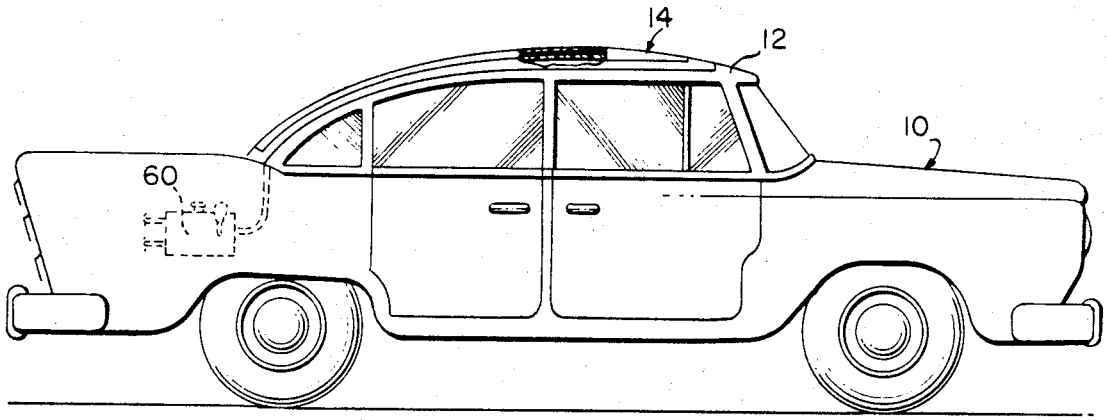
FIG. 1 is a view in elevation of an automobile showing my screening and filtering device positioned in the top of it.
Figure 2:
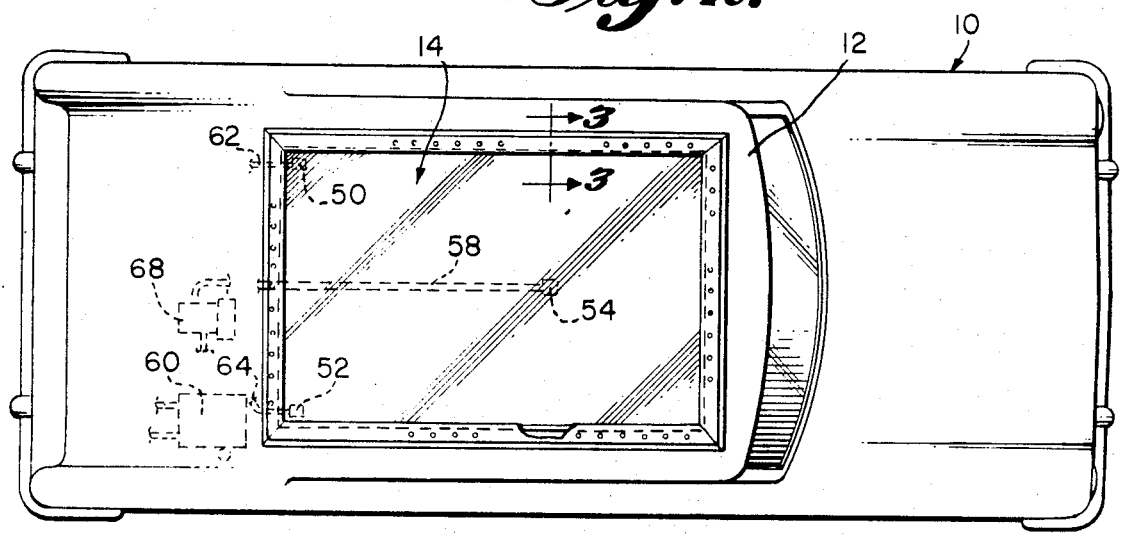
FIG. 2 is a plan view of the automobile showing the screening and filtering device.
Figure 3:
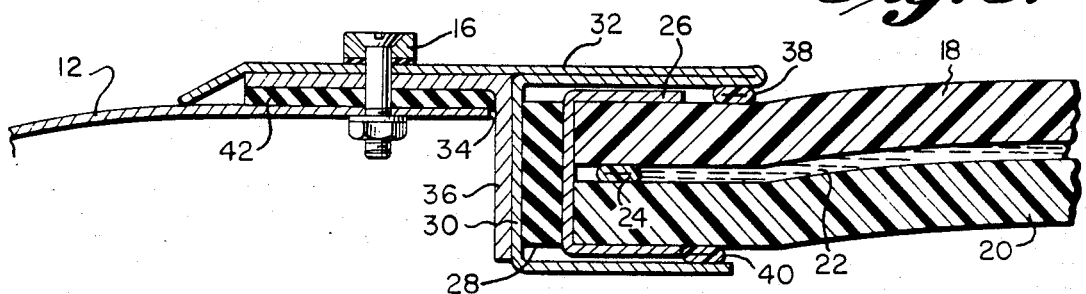
FIG. 3 is a view taken on the line 3—3 of FIG. 2 showing the means for connecting the device to the roof of the automobile and the curved transparent plates spaced by a gasket to provide the thin, elongated cavity.

In the drawings, numeral 10 illustrates a standard automobile having a roof 12. Mounted in the roof of the automobile is transparent roof section 14 held to the roof by a series of spaced bolts 16. The transparent roof section is formed from two curved sheets or plates 18, 20 of transparent plastic, such as "Lucite," equally spaced from each other to form a cavity 22 therebetween. The plates 18,20 are held in spaced relation to each other by a tubular gasket 24 which is positioned around the edge of each plate to complete the cavity 22. The plates are held together against the tubular gasket 24 by a U-shaped channel 26 which clips over the edges of the plates to hold them tightly in sealed arrangement against tubular gasket 24. The bottom of the U-shaped channel 26 has a rubber molding 28 against it and the whole edge assembly of the plates is positioned within a second U-shaped channel 30 which has an extension 32 from its upper leg which extends over the roof 12 of the automobile so as to position the assembly in the roof. The roof of the automobile defines an opening 34 into which fits an L-shaped channel 36 against which the bottom of U-shaped channel 30 abuts with the rubber molding 28 fitted against the bottom of the U-shaped channel 30. Two tubular gaskets 38,40 rest between the inner ends of the U-shaped channel 30 and the outer surfaces of the plates 18,20 respectively to form a tight encasement of the transparent roof section 14 in the roof of the automobile. A rubber gasket 42 is positioned under the horizontal leg of the L-shaped channel which in turn abuts against the inner surface of extension 32 of U-shaped channel 30 (see FIGS. 1, 2, and 3).

The transparent roof section 14 has low point of gravity openings 50,52 and a high point of gravity opening 54 which communicate with the cavity 22. The openings are all formed by drilling a hole through one of the plates 18,20 and cementing to the plate a conduit connector 56 over which the end of a conduit 58 is placed. Opening 54 has conduit 58 connecting the top of reservoir 60 with the high point of gravity of cavity 22. In like manner, low point of gravity openings 50,52 have conduits 62,64 which connect the low point of gravity of the reservoir 60 with the cavity 22 through conduit 66. In conduit 66 is positioned a pump 68 for pumping the heavy or high specific gravity liquid into and out of the cavity. The pump is controlled by a solenoid switching means 70. Also, a second solenoid switching means 71 may be used. A filter 72 is positioned in line 66 to remove any foreign material that may be in the liquid or be developed during the operation of the system. On top of reservoir 60 is positioned a bleeder valve 74 to remove air from the system and put liquids into it. Connected to the reservoir 60 is an expansion means 76. The expansion means has a rubber ball 78 surrounded by coarse wire mesh and a conduit pipe 82 for passing liquid to and from the ball. When the liquid in the system expands, the rubber protrudes out of the spaces between the wire mesh, thereby providing the volume for taking up the expansion (see FIGS. 4, 5, and 7).

In FIG. 6 is shown an alternate arrangement for providing for expansion of the liquid in the reservoir designated as 60'. On the side of the reservoir 60' is positioned a diaphragm 86 having a rubber diaphragm plate 88 over a hole 90 defined by the reservoir 60'. When the liquid expands, the diaphragm plate 88 bulges outward, thereby providing the volume for expansion of the liquids in the system (see FIG. 6).

It will be appreciated that the light screening and filtering system of this invention heretofore described has many types of use. In FIGS. 8 and 9, there is shown its application to a transparent window section 100 where the light liquid enters the cavity 22 between plates 18',20' through a high point of gravity opening, and the heavy liquid enters the low point of gravity opening in cavity 22. The transparent window section has a U- shaped channel 26' which holds the plates 18',20' against a tubular gasket 24' with a rubber molding 28' resting against the bottom of the U-shaped channel 26' and a U-shaped section 30' which has a leg extension 32' that is held by screws 16' against window frame 102 with a rubber gasket 42' therebetween.

In operation, equal amounts of two immiscible liquids of different specific gravities are placed in the reservoir 60 until the cavity 22 and the conduits, filter, and pump are all filled so that there is no air in the system. The system is closed by a bleeder valve which eliminates the air in the system and provides for hermetic sealing of the system. The pump means 68 is then set in motion by solenoid switching means 70 to bring one liquid (the one desired) into the cavity, the other liquid being in the reservoir 60. The pump operates so as to pump the heavy liquid in or out of the cavity. When it is pumping the heavy liquid out of the cavity, it is forcing the light liquid into the high point of gravity opening and thus presenting a cycling of the liquid when the interphase between them moving in the direction of pumping. That is, if the heavy liquid is being pumped out, the interphase in the cavity is receding to the low point of gravity while the interphase in the reservoir is rising to the high point of gravity, and vice versa. Any foreign material that develops during the operation of the system is removed by filter 72.

It will be appreciated that the light screening and filtering system of this invention may be operated to present more than two different types of liquid by increasing the size of the reservoir to hold them.

Also, more than one reservoir may be used with a common liquid in the cavity, which makes up one of the immiscible liquids, and other immiscible liquids in the system that have different characteristics for screening and filtering solar energy. In this type of system, a solenoid for each reservoir is provided so that, after the common liquid fills the cavity, a second solenoid would be activated which would cut off the reservoir that had been operating and would pump different liquid from another reservoir to replace the common liquid which would then enter the reservoir being operated. This procedure could be used on a selective basis with the several types of liquids contained in several reservoirs, thus providing a plurality of different liquids for selective pumping into the cavity to obtain the particular screening and filtering desired among those available from the different liquids in the reservoirs.

Various modifications of the specific embodiments described and shown may be made, and it is understood that the specific embodiments are by way of illustration of the invention and not limiting thereof.

What is claimed is:

1. An hermetically sealed air-free light energy screening and filtering device comprising transparent plates defining a closed cavity therebetween; a reservoir; a conduit connecting said reservoir and cavity at high gravity points; a conduit connecting said reservoir and cavity at low gravity points, said cavity, reservoir and conduits being filled with at least two bodies of immiscible liquids having different light filtering properties and having at least two separate interphases between them within said device, said device being completely free of air; and a reversible pump acting on only one of said liquids directly for moving both said liquids as a unit to and from the cavity and to and from the reservoir to effect change in the body of liquid in said cavity.

2. The light energy screening and filtering device of claim 1 in which said pump is in the low gravity point connection between said cavity and said reservoir.

3. The light energy screening and filtering device of claim 1 in which said pump is in the high gravity point connection between said cavity and said reservoir.

4. The light energy screening and filtering device of claim 1 in which a filter is positioned in at least one of the connections between said cavity and reservoir to clean said liquids.

5. The light energy screening and filtering device of claim 1 in which a bleeder valve is positioned in the system to eliminate air within the liquids.

6. The light energy screening and filtering device of claim 1 in which said reservoir has an expansion means for accommodating expansion and contraction of said liquids.

7. The light energy screening and filtering device of claim 6 in which said expansion means is a diaphragm in the side of said reservoir.

8. The light energy screening and filtering device of claim 6 in which said expansion means is a rubber ball covered with coarse mesh wire.

9. The light energy screening and filtering device of claim 1 in which said immiscible liquids are oils of different specific gravities.

10. The light energy screening and filtering device of claim 1 in which said immiscible liquids are of different colors.

11. The light energy screening and filtering device of claim 1 in which one oil is a light mineral oil and the other is a heavy glycol.

12. The light energy screening and filtering device of claim 1 in which two interphases are between the liquids in the system, one interphase rising as the other interphase descends as one liquid replaces the other in said cavity.

13. The light energy screening and filtering device of claim 1 in which said cavity is defined by two transparent curved plates spaced apart by a tubular gasket around the edge of the two plates.

14. The light energy screening and filtering device of claim 13 in which the plates are plastic.

15. The light energy screening and filtering device of claim 13 in which the plates are glass.

16. The light energy screening and filtering device of claim 1 in which a plurality of reservoirs is used each having a pump controlling it and a different liquid in each reservoir for providing a different filtering and screening effect to serve as one of the liquids in the system, and a common liquid for the other liquid in the system, whereby the operation of any one pump when the common liquid is in the cavity causes the particular liquid in the operated reservoir to fill the cavity.

17. The light energy screening and filtering device of claim 1 in which said transparent plates are positioned horizontally.

18. An hermetically sealed air-free device for screening and filtering light radiation comprising two spaced transparent plates having a gasket between them and positioned near their edges to define a sealed cavity therebetween; openings through one of said plates at the upper and lower gravity points of said cavity; a reservoir having upper and lower gravity point openings; a first conduit connecting the upper gravity point opening in said reservoir with the upper gravity point opening in said cavity and a second conduit connecting the lower gravity point opening in said reservoir with the lower gravity point opening in said cavity; two immiscible liquids of different specific gravities and of different light filtering properties completely filling said device and having at least two separate interphases between them within said device, said device being completely free of air; and a reversible pump positioned in said second conduit for pumping only the liquid of higher specific gravity to effect a movement of both liquids in or out of said cavity and in or out of said reservoir.

19. The light energy screening and filtering device of claim 1 in which said transparent plates form a substantial portion of an automobile roof.

20. The light energy screening and filtering device of claim 1 in which said transparent plates form a window in a building structure.

21. The light energy screening and filtering device of claim 1 in which said transparent plates form a portion of a roof in a building structure.

22. The light energy screening and filtering device of claim 1 in which said transparent plates form a canopy in an airplane.

23. The hermetically sealed air-free device of claim 18 in which said transparent plates are positioned horizontally.

* * * * *